3,253,464
AUTOMATIC TEMPERATURE COMPENSATION IN GAS METERS
Howard J. Evans and John W. Harriger, Du Bois, Pa., assignors to Rockwell Manufacturing Company, Pittsburgh, Pa., a corporation of Pennsylvania
Filed Aug. 13, 1963, Ser. No. 301,748
8 Claims. (Cl. 73—281)

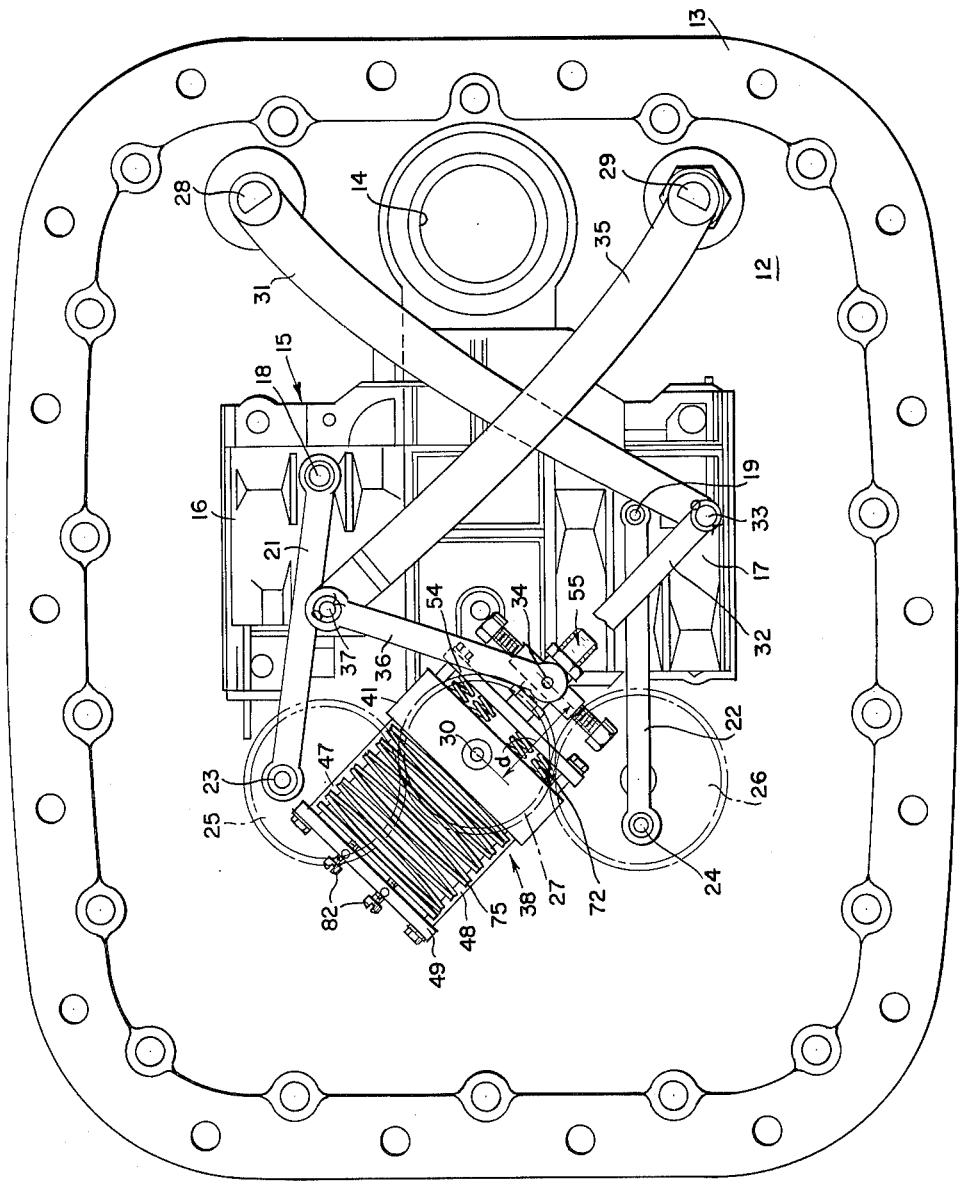

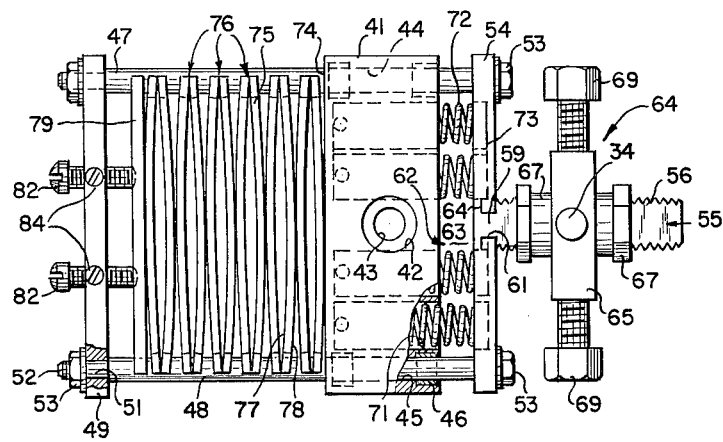
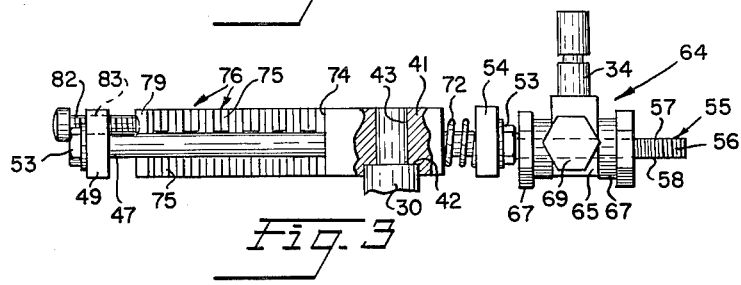
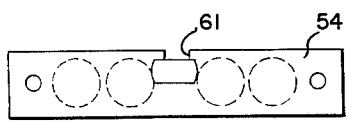
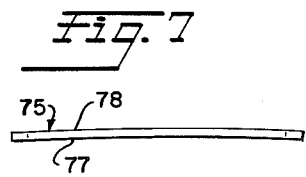
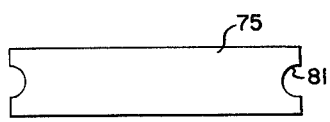
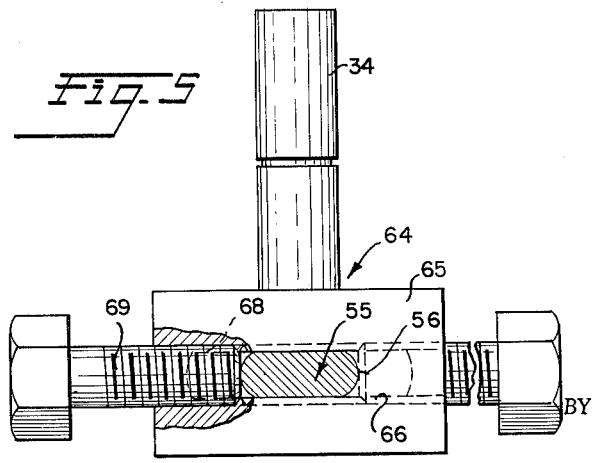
INVENTORS
HOWARD J. EVANS
JOHN W. HARRIGER
BY Strauch, Nolan & Neale
ATTORNEYS

United States Patent Office 3,253,464
Patented May 31, 1966

This invention relates to gas meters and particularly to mechanism for automatically continuously compensating for changing temperature of the gas being metered.

In most conventional gas meters today the gas passes through bellows which are connected to rockable flag rods in turn connected to lazy tong linkages and a tangent arm to actuate the volume indicating register and also control slide valves for admitting and discharging gas to and from the bellows. The tangent arm is a crank rotating about a fixed axis, and its effective length from that axis to its connection to the flag rod linkage is usually manually adjustable. The length of the crank determines the arc of oscillation of the flag rods so that this adjustment varies the stroke of the bellows and therefore the volume of gas passed therethrough with each revolution of the crank arm about its axis.

Various arrangements for automatically varying the effective length of the tangent arm in response to changes in temperature of the gas being metered have been proposed, and certain of these are disclosed in copending application Serial No. 181,384, filed March 21, 1962, for Temperature Compensating Apparatus for Gas Meters. The present invention provides a further improved arrangement of greater adjustment power for arrangements of this type and it is particularly useful for larger gas meters.

It is the major object of the present invention to provide in a gas meter a novel mechanism for continuously automatically varying the effective crank length of the tangent arm in response to changes in temperature of the gas being metered.

A further object of the invention is to provide a novel automatic compensating adjustment for a tangent arm in a gas meter wherein a stack of bowed bimetal elements are mounted on a slidable frame that carries the tangent post and is spring biased to compress the stack in the assembly. Pursuant to this object the bimetal elements are normally bowed and arranged in opposed pairs, and the biasing spring means has constant rate.

Another object of the invention is to provide a novel automatic compensating adjustment for a tangent arm in a gas meter wherein a resiliently balanced frame carrying the tangent post is slidably mounted in substantially frictionless bearings on a rotatable valve control member driven thereby.

It is a further object of the invention to provide a novel automatic compensating adjustment for a gas meter wherein a frame carrying the tangent post is slidably mounted in a support on a rotatable shaft and resilient balance is achieved by a stack of relatively stiff bowed bimetal elements compressed between the frame and one side of the support, and compression spring means is compressed between the frame and the other side of said support. Pursuant to this object a calibrating adjustment is provided for varying the compression of the stack.

Further objects of the invention will appear as the description proceeds in connection with the appended claims and the annexed drawings wherein:

FIGURE 1 is a top plan view showing a preferred embodiment of the invention incorporated in a gas meter;

FIGURE 2 is an enlarged bottom plan view of the automatic temperature compensation mechanism;

FIGURE 3 is a side elevation of the mechanism of FIGURE 2;

FIGURE 4 is an end elevation of the tangent arm and front guide bar subassembly apart from the rest of the mechanism;

FIGURE 5 is a side elevation partially broken away and in section showing the tangent post assembly, with the tangent arm and one lateral adjustment screw also shown;

FIGURE 6 is a plan view of a bimetal element; and

FIGURE 7 is a side elevation of the bimetal element of FIGURE 6.

FIGURE 1 shows a gas meter of the general type disclosed in United States Letters Patent No. 2,818,046, issued December 31, 1957, to Evans et al. The top cover is removed to show the valve chamber above the plate 12 which extends across the body 13 and separates the bellows chambers (not shown) disposed within the body below plate 12 from the valve chamber that in the assembly is enclosed by the top cover.

Plate 12 as shown includes the gas outlet port 14 and adjacent thereto a valve seat assembly 15 on which reciprocates slide valves 16 and 17 having upstanding posts 18 and 19 respectively. Links 21 and 22 are pivoted at their one end on posts 18 and 19 respectively, and pivoted at their other ends to eccentric pins 23 and 24 respectively on gears 25 and 26 that are meshed to the same gear 27. A central vertical valve gear drive shaft 30 is rigid with gear 27 and is connected to drive the meter register by suitable means such as that shown in said Evans patent.

Oscillatable flag rods, the upper ends of which are shown at 28 and 29 in FIGURE 1, are driven from the bellows in the chambers below plate 12. One horizontal lazy tong lever system consists of a lever 31 fixed to flag rod 28 and pivoted to lever 32 at 33, which lever 32 in turn is pivotally connected to vertical tangent post 34. A similar horizontal lever system consists of lever 35 fixed to flag rod 29 and pivoted to lever 36 at 37, which lever 36 in turn is pivoted to tangent post 34.

Tangent post 34 is connected to shaft 30 in the invention by a compensating mechanism 38 which provides a crank arm having an effective length equal to the linear distance between the centers of shaft 30 and post 34. In operation oscillation of the flag rods results in this crank arm continuously rotating gear 27 in a given direction, and this oppositely rotates gears 25 and 26 which act through the eccentric connections and links 21 and 22 to move the slide valves in proper synchronism.

The arrangement of the parts and their timed operation is essentially the same as disclosed in said Patent No. 2,818,046 to which reference is made for further detail. The present invention distinguishes over said patent mainly in the provision of automatic temperature compensation in mechanism 38 whereby the effective length of the crank arm between post 34 and shaft 30 is automatically continuously varied in response to changes in temperature of the gas controlled by the slide valves.

Mechanism 38 is exposed to inlet gas which fills the entire valve chamber above plate 12, and suitable gas inlet and outlet ports are in the cover as shown in said patent, the outlet port being connected to the plate mounted outlet port 14 by a conduit extending through the valve chamber. Thus the mechanism 38 is directly exposed to the temperature of the surrounding incoming gas.

The compensating mechanism 38 which is the main part of the present invention will now be described, with special reference to FIGURES 2 and 3.

Tangent block 41 is rigid with shaft 30 which has a shoulder seating in a counterbore 42 and a reduced upper end fixed within a bore 43 of the block, as by a press fit.

Block 41 has two parallel longitudinal opposite side bores 44 and 45 within which are disposed end bushings 46, one at each end of each bore. Similar guide rods 47 and 48 extend through bores 44 and 45, being slidably supported on bushings 46 which are preferably sleeves of hard, tough smooth plastic such as Teflon (polymerized tetrafluoroethylene) or the modified Teflon known as Rulon for example.

At adjacent ends rods 47 and 48 are fixed together and bridged by a rigid back bar 49 which has bores 51 for receiving the reduced diameter threaded end sections 52 of the rods, and suitable nut and lockwasher assemblies 53 force bar 49 tightly onto the rod shoulders formed by the reduced end sections. At the opposite adjacent ends, which lie on the opposite side of block 41, guide rods 47 and 48 are similarly rigidly interconnected by a front guide bar 54 that is parallel to bar 49, and the rod ends are secured to bar 54 in the same manner as to bar 49.

Guide rods 47 and 48, together with bars 49 and 54 form a rigid rectangular frame that is freely slidably mounted on tangent block 41 for movement normal to the axis of shaft 30.

A tangent arm 55 is rigidly secured to bar 54, and this arm comprises a threaded shank 56 having flat horizontal upper and lower sides 57 and 58 (FIGURE 3) and extending at right angles to the midpoint of bar 54. Arm 55 has a reduced section 59 that fits into an upper recess 61 in bar 54, and its adjacent end 62 fits flush into a counterbore 63 in bar 54 where it is staked and soldered or otherwise fixed. Usually arm 55 is fixed to bar 54 in subassembly before mounting arm 54 on the guide rods.

A tangent post assembly 64 is adjustably mounted on tangent arm 55, and comprises a base 65 formed with a horizontal flat sided through slot 66 adapted to slidably receive the threaded end section 56 of the tangent arm. As shown in FIGURE 5, slot 66 is about twice as long as the threaded diameter at 56, and is sufficiently wide to enable free horizontal sliding of arm 55. At opposite sides of base 65, tangent arm lock nuts 67 are mounted on the threaded arm section 56, and they are relatively adjusted to displace the tangent post assembly along arm 55 and hold it in adjusted position.

Tangent post 34 which is essentially cylindrical is rigid with base 65 and rises above it centered both longitudinally and laterally with slot 66, so that adjustment of base 65 by nuts 67 positions the axis of post 34 along a vertical plane containing the axis of tangent arm 55.

At opposite ends base 65 is formed with threaded bores 68 that enter the ends of slot 66, and tangent post adjustment screws 69 are mounted in bores 68 to extend into engagement with opposite sides of tangent arm 55 within the slot. Thus, by adjustment of screws 69, the axis of post 34 is displaced in a plane perpendicular to the axis of tangent arm 55, and held in adjusted position.

Referring to FIGURE 2, tangent block 41 is formed with a plurality of longitudinal pockets 71 that open toward bar 54 and contain coiled compression springs 72 adapted to extend toward bar 54 and enter similar but more shallow aligned pockets 73 in bar 54. Four springs 72 are shown but any number may be used, preferably uniformly arranged at opposite sides of shaft 30 in the assembly, so that they provide a laterally balanced resilient means for biasing bar 54, and hence the entire rectangular frame and the tangent post assembly, to the right in FIGURE 2.

Oppositely, block 41 is formed with a flat face 74 perpendicular to the guide rods, and disposed between face 74 and the back bar 49 are a plurality of oppositely facing bowed bimetal strip elements 75 so as to be arranged in pairs 76 in a stack with their concave high expansion sides 77 facing each other and their convex low expansion sides 78 engaging each other. As shown in FIGURE 2 the convex side 78 of the innermost element 75 contacts block face 74, and the convex side of the outermost element contacts a rigid straight flat spacer bar 79.

As shown in FIGURE 6, each end of each bimetal strip 75 has a half circular guide and support recess 81 which fits loosely slidably onto the adjacent cylindrical guide rod 47 or 48. Spacer bar 79 has similar recesses at opposite ends.

The stack of bowed resilient bimetal elements 75 slidably mounted on the guide rods may be resiliently compressed in the direction of block 41 by means of a pair of adjustment screws 82 threaded in bores 83 of bar 49 and engaging spacer 79, and screws 82 are locked in adjusted position by set screws 84.

In operation of the assembly of FIGURE 1, the rigid tangent post carrying means, consisting of bars 49 and 54, rods 47 and 48 and tangent arm 55, is biased away from shaft 30 by springs 72 which also compress the stack of resilient elements 75. The resilient oppositely acting forces of compressed springs 72 on the one hand and the compressed stack of bimetal elements on the other hand are balanced. Thus for a selected normal gas temperature in the valve chamber, there will be a given distance $d$ between shaft 30 and tangent post 34. Should this temperature increase, each bimetal element 75 will tend to straighten out or elongate. Elements 75 have sufficiently loose sliding fit with the guide rods to permit this within the necessary range required in practice. As a result springs 72 will expand at once to shift tangent post 34 farther away from shaft 30, this increasing the effective crank length between the tangent post 34 and shaft 30 and so increasing the stroke of the bellows that the volumes of gas passed therethrough is correspondingly increased during each revolution of the tangent arm and shaft 30. The converse holds true for reducing gas temperatures.

The invention employs a stack of relatively stiff bimetal elements 75 biased by helical springs 72 which have a constant spring rate at least over the range of normal operation. By using relatively stiff elements the invention insures that the mechanism 38 will retain a stable longitudinally stiff overall condition and will not accidentally collapse or elongate during normal operation. By using a plurality of bimetal elements in a stack the invention accumulates individual small deflections of the elements for a temperature change, and thus provides a large overall deflection for that change. Since the deflection travel of a bimetal element is more linear within small temperature ranges, this stacking therefore provides a large magnitude of linear adjustment within the operative temperature range, and it is superior to the non-linear response of an equivalently large single bimetal member.

The constant rate springs 72, which are sufficiently powerful to load the stack of bimetal elements, do not change the linear response of the bimetal elements, so that the overall response remains linear during adjustment.

The manual adjustment at screws 82 serves to vary the compression of the bimetal stack as a calibration adjustment for the meter. In practice this adjustment provides that for a gas temperature of minus 30° F. the bimetals will curl sufficiently to displace bar 54 into contact with block 41 so that no further compensative adjustment can take place in operation. The amount of curvature or bow of elements 75 is usually so selected that the elements will become straight at about plus 130° F., thereby establishing the other limit of automatic adjustment.

The invention has been found to be particularly efficient and accurate for larger gas meters which require larger and more powerful tangent post displacement forces.

Automatic temperature compensation insures that the register shows volume at a standard temperature on which the price is based and the customer pays for gas according to the heat value rather than the volume as received, and this is quite important where gas meters may be out-side the building in climates that vary between freezing temperatures in winter and very high summer temperatures.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a gas meter of the type wherein bellows driven flag rods are connected by motion transmitting linkage to a tangent assembly, said tangent assembly comprising a member rotatable about a fixed axis, spaced parallel bores in said member extending at right angles to said axis, bushings in said bores, a tangent arm support slidably mounted on said member by means of guide rods extending through said bushings and carrying a tangent post pivotally connected to said linkage, a plurality of pairs of oppositely bowed bimetal elements arranged in a stack axially confined between said support and one side of said member, and laterally balanced spring means compressed between said support and the other side of said member.

2. In the gas meter defined in claim 1, said bushings being liners of tough, hard, smooth plastic within said bores.

3. In the gas meter defined in claim 1, said support being a frame having a back bar bridging said guide rods and the adjacent end of said stack, a front bar bridging said guide rods and the adjacent end of said spring means, and a tangent arm rigid with said front bar carrying said post.

4. In a gas meter of the type wherein bellows driven flag rods are connected by motion transmitting linkage to a tangent assembly, said tangent assembly comprising a member rotatable about a fixed axis, a tangent arm support slidably mounted on said member and carrying a tangent post pivotally connected to said linkage, said support having opposite sides disposed on opposite sides of said axis, a plurality of pairs of oppositely bowed bimetal elements arranged in a stack axially confined between said support and one of said opposite sides of said member, spring means compressed between said support and the other of said opposite sides of said member, and means for calibrating said meter comprising means on said one opposite side of said support adjustably engaging the element at the adjacent end of said stack for measurably compressing said stack of elements.

5. In a gas meter of the type wherein bellows driven flag rods are connected by motion transmitting linkage to a tangent assembly, said tangent assembly comprising a member rotatable about a fixed axis, said member having spaced parallel bores extending at right angles to said axis, tangent arm support having parallel guide rods passing through said bores slidably mounted on said member, front and back rigid bars bridging said rods at opposite sides of said member to form a substantially rectangular frame, a tangent arm rigidly projecting from said front bar, a tangent post on said arm pivotally connected to said linkage, a plurality of pairs of oppositely bowed bimetal elements arranged in a stack axially confined between one end of said frame and one side of said member, and spring means compressed between the other end of said frame and the other side of said member.

6. In the gas meter defined in claim 5, the opposite ends of said bimetal elements being recessed for loose sliding interfit with said guide rods.

7. In the gas meter defined in claim 6, a rigid spacer bar having opposite ends slidably mounted on said rods and disposed within said frame between said back bar and the adjacent end of said stack, and adjustable means on said back bar for shifting said spacer bar to vary the compression of said stack.

8. In a gas meter of the type wherein bellows driven flag rods are connected by motion transmitting linkage to a tangent assembly, said tangent assembly comprising a member rotatable about a fixed axis, a tangent arm support slidably mounted on said member and carrying a tangent post pivotally connected to said linkage, a plurality of pairs of oppositely bowed bimetal elements arranged in a stack axially confined between said support and one side of said member, spring means compressed between said support and the other side of said member, and means for calibrating said meter comprsing means for measurably compressing said stack of elements comprising a rigid bar extending across the end of the stack opposite said member and means for adjustably mounting said bar on said support.

References Cited by the Examiner
UNITED STATES PATENTS

| | | | |
|---|---|---|---|
| 3,044,295 | 7/1962 | Shivers | 73—363.5 |
| 3,069,927 | 12/1962 | Douglas et al. | 73—281 |

RICHARD C. QUEISSER, *Primary Examiner.*

J. C. GOLDSTEIN, *Assistant Examiner.*